United States Patent [19]

Sirkin

[11] Patent Number: 4,681,242

[45] Date of Patent: Jul. 21, 1987

[54] SOLVENT PUMP

[75] Inventor: Robert Sirkin, Fullerton, Calif.

[73] Assignee: Charles Wyle Engineering Corporation, Torrance, Calif.

[21] Appl. No.: 773,001

[22] Filed: Sep. 5, 1985

[51] Int. Cl.$^4$ .......................... B67D 5/22; G01F 11/00
[52] U.S. Cl. ........................................ 222/41; 222/47; 222/130; 222/173; 222/309; 222/334; 222/372; 222/390; 222/391
[58] Field of Search ............... 222/309, 282, 391, 390, 222/386, 334, 333, 380, 372, 180, 173, 130, 129, 41, 47, 49, 50, 48

[56] References Cited

U.S. PATENT DOCUMENTS

| | | | |
|---|---|---|---|
| 3,390,815 | 7/1968 | Kavan et al. | 222/390 X |
| 3,687,339 | 8/1972 | Dessureault | 222/391 X |
| 3,931,915 | 1/1976 | Downings et al. | 222/333 X |
| 3,963,151 | 6/1976 | North, Jr. | 222/334 X |
| 4,428,511 | 1/1984 | Howell | 222/309 |

Primary Examiner—Joseph J. Rolla
Assistant Examiner—David H. Bollinger
Attorney, Agent, or Firm—Thomas I. Rozsa

[57] ABSTRACT

A pump for delivering precisely metered discrete quantities of solvent containing suspended solids in rapid cycles. The pump ejects the solvent from a cylinder in amounts proportional to discrete longitudinal movement of a piston inside the cylinder and eliminates internal valves that may become clogged.

1 Claim, 4 Drawing Figures

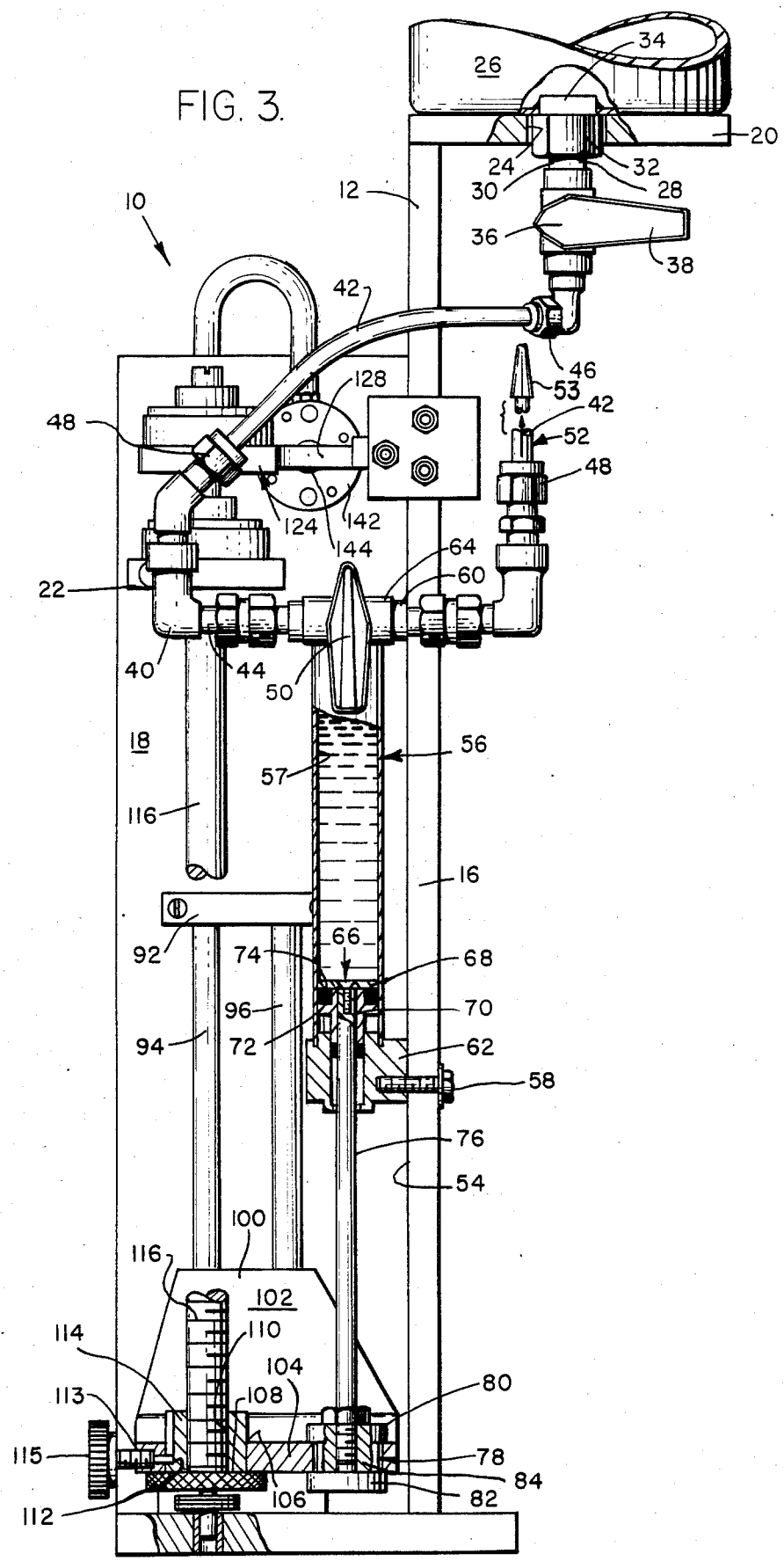

SOLVENT PUMP

BACKGROUND OF THE INVENTION

1. Field of the Invention

The present invention relates to solvent pumps which are used to pump adhesives to a site where bonding of two components can occur. The solvent can be used in conjunction with mass production apparatus which requires a minute quantity of such solvent to be delivered to the adhesion cite on a precisely timed repetitive basis.

2. Description of the Prior Art

In general, solvent metering pumps are known in the prior art. An illustration of one specific type of solvent pump which illustrates principles of prior art pumps is shown in FIG. 1 and is marked "PRIOR ART". This type of pump is manufactured by Valcor Engineering Corp. and is commonly known as a solenoid metering pump. A cross-sectional view of this type of pump is shown in FIG. 1. The pump 300 has a piston 302 which is pulled upward when a solenoid coil 304 is electrically energized. When the solenoid coil 304 is deenergized, a return spring 306 causes the piston 302 to move downwardly and return to its at rest position. The piston 302 moves inside a tube 310. The lower end of the tube 310 is enlarged to form a cylindrical chamber 312. The lower end of the piston 302 is enlarged to form a piston head 303. The piston head 303 divides the chamber 312 into an upper chamber 314 and a lower chamber 316. The piston head 303 contains a groove 305. A torroidal elastomeric pump ring 318 is contained in the groove 305.

When the solenoid coil 304 is energized the piston 302 is pulled upward. This in turn enables the pump ring 318 to form a seal between the piston head 303 and the wall of chamber 312. Fluid such as solvent 320 located in the upper chamber portion 314 is forced through the tube 310 and through outlet 322. At the same time, an inlet poppet check valve 324 is opened and solvent 320 is drawn into the lower chamber portion 316 through inlet 326. When the solenoid coil 304 is de-energized so that the return spring 306 forces the piston 302 back to its at rest position, the poppet check valve 324 closes by means of return spring 328 and solvent 320 is forced from the lower chamber portion 316 into the upper chamber portion 314 through a longitudinal slot 307 in the piston 302. The amount of solvent pumped during each cycle depends on the piston stroke length which can be manually adjusted.

In principle, most prior art metering pumps work along the principles of the illustrative example set forth above. The prior art works well for applications of solvent which is primarily in pure liquid form and does not contain any solid particulates. The prior art metering pumps do not work properly when they are required to pump solvents containing solid particulate adhesive matter due to the incorporation of check valves in the prior art designs. The solid particulate matter adheres to portions of the valve or valve seat, thereby interfering with proper opening and closing of the check valve assembly. This creates many problems in the operation of the pump. Since the check valve cannot close properly, there is additional pressure for excess fluid or solvent attempting to enter the pump from the major fluid or solvent reservoir. Since the adhesive causes the check valve to open improperly, insufficient fluid may be delivered through the pump. In addition, the improperly operating check valve may cause the timing of the entire pump to be off its set delivery timing and therefore solvent may be delivered to a site at an improper moment. While the check valve assembly has been illustrated in one position in the example set forth above, other metering pumps may have one or more such check valves at different locations throughout the pump. When solvent containing solid particulates comes in contact with one or more of such check valves, one or more of the problems set forth above will occur, thereby substantially interfering with the operation of the pump. Since such pumps are used on mass production machines which require the solvent to be delivered to a particular bonding site at a precise time during many repetitive cycles performed at high speeds, a problem can occur and not be noticed by the operator until substantial damage has been done to the pump, to parts of the assembly machine with which the pump is associated and to numerous parts being bonded together during the assembly operation.

There is no presently available metering pump which efficiently delivers solvent containing solid particulate matter for applications of use during a precise timing cycle requiring many rapid repetitions.

SUMMARY OF THE PRESENT INVENTION

The present invention relates to a novel solvent pump which can deliver precise quantities of solvent containing solid particulate matter to a precise location at a prescribed precise series of timing cycles requiring many rapid repetitions. The present invention is particularly useful for delivering precise quantities of cyclohexanone containing polyvinyl chloride particulates for purposes of providing the bonding solvent to bind polyvinyl tubing to objects used in conjunction with the tubing.

It has been discovered, according to the present invention, that if a solvent pump contains a solvent delivery apparatus which entirely eliminates the use of valves in the locations where the apparatus comes in direct contact with the solvent, then the solvent pump can be used to deliver quantities of solvent containing solid particulate matter without incurring problems associated with prior art solvent metering pumps.

It has also been discovered, according to the present invention that if solvent is delivered to the site of adhesion by means of moving a piston upwardly in a chamber containing the solvent and the piston is caused to move upwardly by external mechanical means, then check valves and other similar types of valves can be entirely eliminated from coming in contact with the solvent.

It has further been discovered, according to the present invention, that if the piston which delivers the force to cause the solvent to enter the required location is connected to external mechanical actuating means which causes the piston to move in one direction at precise timing intervals, then the novel solvent pump can deliver precise quantities of solvent containing solid particulate matter to a precise location at a prescribed precise series of timing cycles requiring many rapid repetitions.

It has additionally been discovered, according to the present invention, that if the mechanical actuating means incorporates into its structure an apparatus for providing a signal when the cylinder containing the solvent is almost empty, then the pump can be efficiently turned off by an operator so that the cylinder may be refilled with solvent without the necessity of expensive machine down time or the occurrence of parts being brought together without being properly bonded due to insufficient or a total lack of solvent being properly applied.

It is an object of the present invention to provide an apparatus for delivering precise quantities of solvent containing solid particulate matter as well as regular pure fluid solvent to a given location at a prescribed precise series of timing cycles requiring many rapid repetitions.

It is another object of the present invention to provide a solvent pump which can deliver precisely timed quantities of solvent containing solid particulate matter for use in conjunction with a mass production assembly machine.

It is a further object of the present invention to entirely eliminate the use of valves such as check valves from portions of a solvent metering pump which come in contact with the solvent.

It is an additional object of the present invention to provide a solvent metering pump which is operated by mechanical means in a simple and efficient manner to precisely deliver required quantities of solvent, to signal an operator when the pump is almost out of solvent, and to permit efficient refilling of the solvent pump without extensive down time or damage to the pump, to the assembly machine with which the pump is associated, or to products being assembled by the machine.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

FIG. 3 is a side view of the present invention with the solvent cylinder shown in cross-section.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 2:
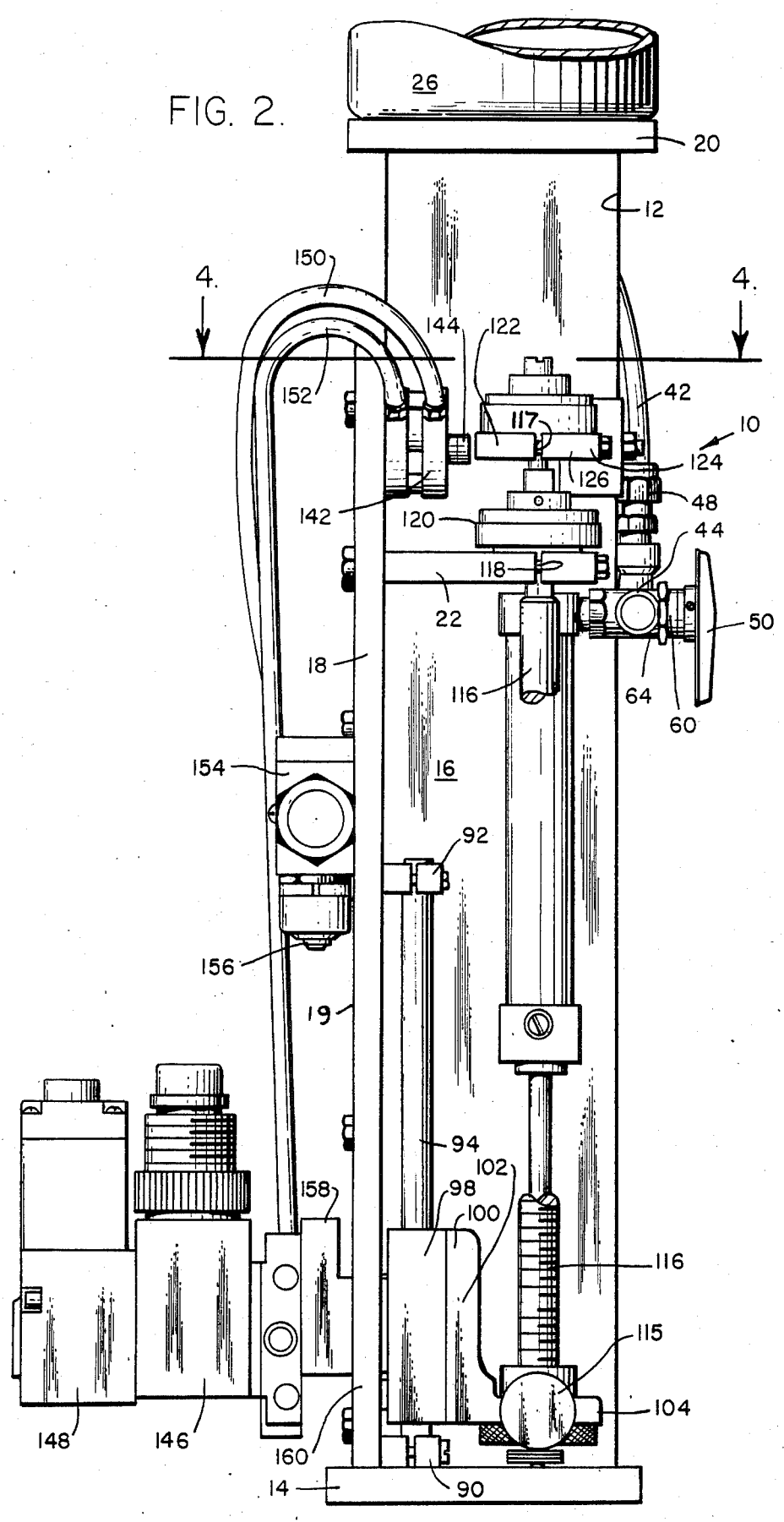
FIG. 2 is a front view of the present invention.

Referring to FIG. 2 and FIG. 3, the present invention Solvent Pump is shown at 10. The solvent pump 10 is housed on a mainframe member 12 which in turn consists of a base plate 14, a first side plate member 16, a second side plate member 18, a top plate member 20 and a clutch mounting plate member 22. As shown in FIG. 2, first side plate member 16 is supported on base plate 14 and extends perpendicularly thereto. The top of first side plate member 16 in turn supports first top plate member 20. First top plate member 20 is perpendicular to first side plate member 16 and generally parallel to base plate 14. As shown in FIG. 3, second side plate member 18 is also supported on base plate 14 and extends perpendicularly thereto. Second side plate member 18 in turn supports clutch mounting plate member 22 at a location below the top of the second side plate member 18. First side plate member 16 and second side plate member 18 are dipsosed perpendicular to each other and are attached to each other, thereby lending further mutual support. In the preferred embodiment, all components of the mainframe member 12 are made of metal such as stainless steel or aluminum.

First top plate member 20 contains a slotted opening 24. A solvent reservoir 26 rests on top of first top plate member 20 and is attached thereto by means of a first hollow coupling member 28. By way of example, the first hollow coupling member 28 can consist of a pipe member 30 and hexagonal pipe coupling nut 32 which is screwed onto the pipe member 30 and also screws onto a threaded opening 34 in the solvent reservoir 26. The first hollow coupling member 28 further comprises a first ball valve 36 which is opened and closed by means of first handle member 39. The first hollow coupling member 28 is in turn connected to a second hollow coupling member 40 by first tubing 42. Second hollow coupling member 40 can comprise a threaded pipe member 44 and a multiplicity of hexagonal coupling nuts . The tubing 42 is attached to first hollow coupling member 28 by coupling nut 46 and to second hollow coupling member 40 by coupling nut 48. The threaded pipe member 44 further comprises a 3-way ball valve 50. At its second end 52, the second hollow coupling member 40 is attached to the solvent ejection nozzle 53 (FIG. 3) which is placed at the location where the solvent is to be applied to the parts to be bonded together. The connection can be by means of tubing or comparable connecting means.

Spaced a short distance from the interior face 54 of first side plate member 16 is a hollow solvent cylinder 56. As shown in FIGS. 2 and 3, the solvent cylinder 56 is open at its top portion which leads into the hollow coupling member 40 adjacent the location of the 3-way ball valve 50 by conventional coupling means 64 such as a threaded pipe supported by nuts or threaded into the respective components. An internal channel (not shown) in the hollow coupling member 40 provides a passageway from the 3-way ball valve 50 to the hollow cylinder 56. As shown in the cross-sectional view of the cylinder 56 in FIG. 3, a piston 66 is located at the bottom of the cylinder 56 adjacent a support member 62 which supports the cylinder 56 on the internal wall 54 of first side plate member 16. The connection is made by the threaded bolt 58. The piston 66 comprises a head portion 68 and an extension portion 70. The head portion further comprises a circumferential groove 72 which houses an "O" ring sealing member 74 (or alternatively a cup seal sealing member, not shown) which by way of example can be made of teflon. The piston 66 is supported by piston rod 76 which at its upper end is inserted into the piston extension portion 70. The lower end of piston rod 76 is affixed to rod end coupling member 78. By way of example, rod end coupling member 78 can be a generally H-shaped piece of metal tubing with an upper face 80, a lower face 82, and a recessed mid-portion 84.

A pair of stationary support brackets 90 and 92 are affixed to second side plate member 18. The first such stationary support bracket 90 is located adjacent base plate 14 while the second stationary support bracket 92 is set at a distance above the base plate 14. The stationary support brackets 90 and 92 support a pair of stationary rods 94 and 96. A movable slide member 98 is movably attached to the pair of stationary rods 94 and 96 through channels (not shown) which extend through the length of the slide member 98. The movable slide member 98 is affixed to an angle bracket member 98 which comprises a vertical portion 102 attached to the movable slide member 98 and a horizontal portion 104 extending perpendicularly thereto. The horizontal portion 104 of the angle bracket member 100 contains a transverse opening 106.

Movably inserted through the transverse opening 106 is a T-shaped lead nut 108 which contains an internally threaded shaft 110. The horizontal portion 112 of the T-shaped lead nut presses against the lower surface of the horizontal portion 104 of angle bracket member 100 while the vertical portion 114 of the T-shaped lead nut extends through the opening 106. Securing means such as a cap screw 115 extends through an internal threaded passage 113 in the side of the horizontal portion 104 of angle bracket member 100. When in the fully tightened position, the cap screw 115 abuts the vertical portion 114 of T-shaped nut 108 and causes the angle bracket 100 and T-shaped nut to move together. When the cap screw 115 is loosened, the T-shaped nut 108 can move independently of the angle bracket 100. At the opposite side, the horizontal portion 104 of angle bracket 100 is joined with rod end coupling member 78 such that the horizontal portion 104 abuts the recessed mid-portion 84 of the rod end coupling member 78 and is sandwiched between its upper face 80 and its lower face 82.

Figure 1:
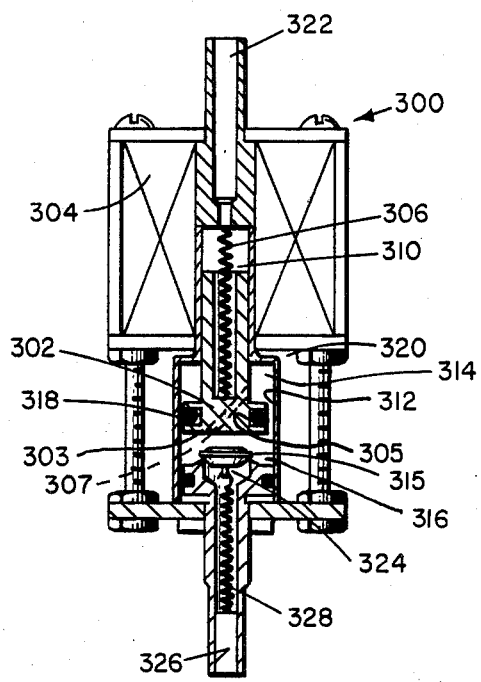
FIG. 1 is a cross-sectional view of a common PRIOR ART solvent metering pump.
Figure 4:
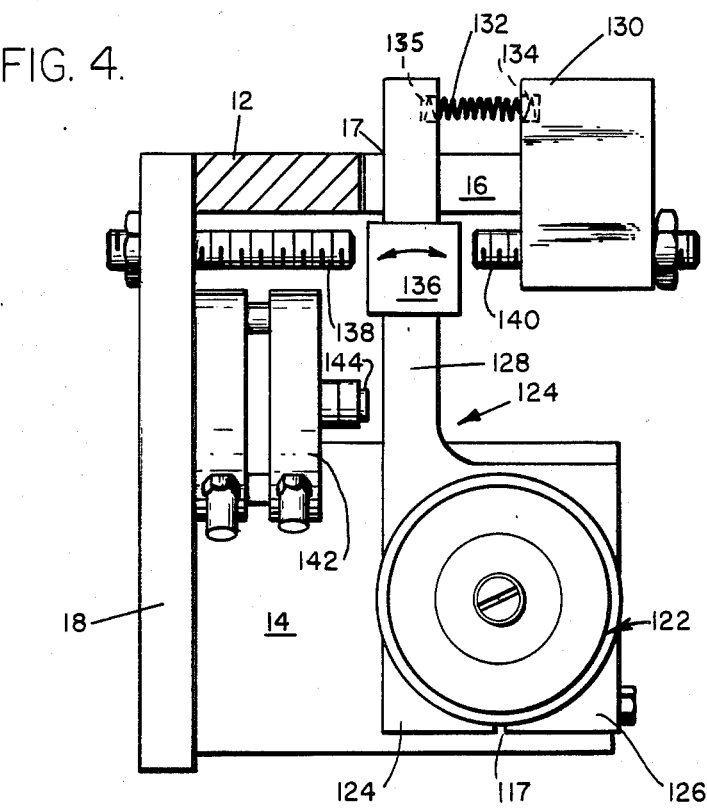
FIG. 4 is a top plan view of the present invention, looking from the direction of arrows 4—4 in FIG. 2.

Threaded through the internally threaded shaft 110 of T-shaped nut 108 is a threaded rod 116. The threaded rod 116 is rotatably supported at its lower end by the T-shaped nut 108 adjacent base plate 14 so that it extend transversely thereto and parallel to the piston rod 76. Clutch mounting plate 22 contains a transverse opening 118 to permit the upper portion of the threaded rod 116 to pass therethrough. Attached adjacent the upper portion of threaded rod 116 and movably supported by the clutch mounting plate 22 is a first one-way clutch 120. Attached at the top of the threaded rod 116 is a second one-way clutch 122. Both one way clutches permit the threaded rod 116 to rotate in the same direction. Attached to the lower extremity of the second one-way clutch 122 is a movable lever arm assembly 124 which comprises a base portion 126 attached to the second one-way clutch 122 through base portion opening 117, and to the threaded rod 116 and an arm portion 128 extending in a direction generally parallel to the base plate 14 and toward first side plate member 16 (see FIG. 4). First side plate member 16 contains a slotted opening 17 to permit the arm portion 128 to pass therethrough and to move in a horizontal direction within the first side plate member 16. The rear face of first side plate member 16 contains a spring support member 130 which supports a return spring means 132 through opening 134. Return spring means 132 is movably inserted into an opening 135 adjacent the tip of arm portion 128. Attached to the arm portion 128 at a location adjacent the front face of the first side plate member is a stop block 136. On either side of the arm portion 128 adjacent the first side plate member 16 at the location of the stop block 136 are a pair of adjustable arm stopping means. First adjustable arm stopping means 138 is supported on second side plate member 18 and extends toward the arm portion 128 and stop block 136. Second adjustable arm stopping means 140 is supported by spring support member 130 on first side plate member 16 and extends towards arm portion 128 and stop block 136 in the direction opposite to the first adjustable arm stopping means 138. By way of example, first and second adjustable arm stopping means can be threaded shafts and this distance between the tip of each shaft and the stop block 136 can be varied by rotating each respective shaft in the appropriate direction.

Attached to the front or internal face of the second side plate member 18 is an air cylinder 142 with a movable tip 144 aligned withe arm portion 128 of the movable lever arm assembly. Located adjacent the outer face of second side plate member 18 is a directional air valve 146 which is triggered by an electrical start means 148. An air intake connecting means such as a first length of tubing 150 and an air exhaust connecting means such as a second length of tubing 152 connect the directional air valve 146 to the air cylinder 142.

Located on the rear or outer face 19 of second side plate member 18 is signalling means 154. The signalling means 154 further comprises an activating switch 156 located on its lower extremity. Second side plate member 18 further comprises an elongated vertically disposed internal slot 160 extending from adjacent base plate 14 to adjacent the activating switch 156 on signalling means 154. A button or switch activating member 158 is attached to the rear face of the slide member 98, through the slot 160 and aligned with the activating switch 156.

Having thus described the apparatus of the present invention in great detail, its operation will now be discussed. The solvent reservoir 26 is filled with solvent. First ball valve 36 is rotated to the open position so that solvent may flow through the first hollow coupling member 28 to the second hollow coupling member 40. Three way ball valve member 50 is rotated to the open position to permit solvent to flow from the second hollow coupling member 40 to the hollow cylinder 56. At the start of the cycle, the cap screw 115 is loosened to permit the T-Shaped nut 108 to move independently of the angle bracket 100. The nut 108 is screwed downwardly on the threaded rod 116 until it is adjacent base plate 14. The angle bracket 100 is then manually moved downwardly and slide member 98 is forced downwardly as well. In addition, since the horizontal portion 104 of angle bracket 100 is coupled to the rod end coupling member 78 as previously described, the rod end coupling member 78 and attached piston rod 76 are also forced to move downwardly. This in turn causes piston 66 to move downwardly inside chamber 57 of hollow cylinder 56. The dimensions of the apparatus are such that when the angle bracket 100 has been moved all the way down to where the lower horizontal surface of its horizontal portion 104 comes in contact with the horizontal portion 112 of T-shaped lead nut 108, the piston 66 is at the bottom of the cylinder. The movement of the piston 66 downwardly inside the chamber 57 creates a suction effect and solvent fills the chamber 57. With the chamber thus filled, first ball valve 36 is moved to the closed position to prevent further solvent from entering through the solvent reservoir 26 and three-way ball valve 50 is rotated to the opposite position so that sol- vent will go from the cylinder 57 to the solvent application nozzle. The cap screw 115 is also tightened.

The electrical start means 148 is activated and this causes air to enter the air cylinder 142 through first tubing 150 on the intake stroke and air to exit the air cylinder 142 through second tubing 152 on the exhaust stroke. When air enters the air cylinder 142, movable tip 144 moves forward and hits the arm portion 128 of movable lever arm assembly 124. As the arm 128 is thereby caused to move away from the air cylinder 142, it imparts a rotational motion to second one way clutch 122. This in turn cauess the threaded shaft 100 to rotate by a given amount which in turn causes the T-shaped nut 108 to rotate upwardly on said threaded rod by the same amount. As the T-shaped nut 108 moves up the threaded shaft 110, it causes the angle bracket 100 to move upwardly with it. This in turn causes the rod end coupling member 78 to move upwardly which in turn causes piston 76 to move upwardly. As the piston 76 moves upwardly, a selected amount of solvent is caused to exit the chamber 57 of hollow cylinder 56 and exit the nozzle where it is applied to the parts which are to be bonded together. The amount of rotation of the threaded rod 116 and corresponding vertical distance moved by the T-shaped nut 108, angle bracket 100 and piston 66 is determined by the stroke length of arm 128. This can be adjusted to any desired amount of setting first adjustable arm stopping means 138 and second adjustable arm stopping means 140 at the desired distance from the stop block 136 on arm 128.

On the exhaust cycle, the movable tip 144 returns to its at rest position as air is exhausted from the directional air valve 146. The return spring 132 causes the arm 128 to rotate back to its original position but first one-way clutch 122 prevents the threaded rod 116 from rotating with the moveable lever arm assembly 124. Therefore, the angle bracket 100 and its attachments and the piston 66 remain stationary during this cycle. The intake cycle on the air cylinder begins again and the process is repeated.

As the solvent is caused to exit the chamber 57 of hollow cylinder 56 through repeated cycles, the piston 66 moves upwardly and the angle bracket 100 and its attachments also move upwardly. This in turn causes the attached switch button activator member 158 to move upwardly. The parts are adjusted such that as the cylinder is nearing being empty, the top of the switch button activator member 158 comes in contact with the switch button 156 and activates the signalling means 154 to warn the operator that the cylinder 56 is nearly out of solvent. The operator can then stop the air cylinder electrical start means 148 and refill the cylinder through the process previously described.

Through use of the present invention, any type of solvent can use dispensed from the solvent pump 10. This includes conventional entirely fluid solvents such as cyclohexanone and also includes fluid solvents which contain solid particulates therein such as polyvinyl chloride mixed with cyclohexanone. This is due to that fact that the entire cylinder portion 56 and all other components which are directly in contact with the solvent while it is retained in the cylinder or dispensed therefrom to the parts to be bonded do not have any valves which may become occluded or otherwise impaired as previously described.

The embodiment described herein has been described in great detaili with specific parts. It will be appreciated that the present invention can be embodied in several alternative or comparable mechanical arrangements without departing from the spirit and scope of the present invention. For example, the solvent reservoir can be described generally as being supported by a mainframe member. The various detailed coupling members and the associated valves can be more generally described as connecting means interconnecting the solvent reservoir to the internal chamber of the hollow solvent cylinder. The valves which permit the solvent to flow from the reservoir to the interconnecting means and from the interconnecting means to either the solvent cylinder or alternatively from the solvent cylinder to the solvent ejection nozzle can be described as adjsutable valve means. The specific pair of one-way clutches can be more generally described as one-way clutch means. The entire structure of the movable slide member, the angle bracket member and the Tshaped lead nut can be more generally described as piston rod moving means. The movable lever arm assembly can be more generally described as rod rotating means. The embodiment of the stop block and the adjustable pair of arm stopping means can be more generally described as adjustable stopping means.

Defined even more broadly, the entire hollow solvent cylinder can be defined as solvent holding means while the internal piston and its associated components can be defined as solvent ejection means. The entire slide member, angle bracket, T-shaped lead nut and its interconnection with the generally H-shaped member can be more broadly defined as longituidnal movement means. The entire lever arm assembly and its associated components and the pair of one-way clutches can be more broadly defined as rotation means causing the longitudinal movement means to rotate in one direction only and simultaneously move in a longitudinal direction by a predetermined amount.

It is clear that the broad concept of the present invention is to provide a series of interconnected mechanical components which permit the solvent to be ejected from the solvent cylinder in precise predetermined amounts through the longitudinal movement of solvent ejection means such as the piston inside the cylinder and to eliminate any valves which may become occluded with particulate matter from being involved in the repetative solvent ejection process. The series of precise mechanical components can be varied without departing from the spirit and scope of the present invention.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the invention might be embodied or operated.

The invention has been described in considerable detail in order to comply with the patent laws by providing a full public disclosure of at least one of its forms, However, such detailed description is not intended in any way to limit the broad features or principles of the invention, or the scope of patent monopoly to be granted.

What is claimed is:
1. A solvent pump comprising:
   a. a mainframe member;

b. said mainframe member comprising a base plate, a first side plate member, a second side plate member, a top plate member and a clutch mounting plate member;
c. said first side plate member being supported on said base plate and extending perpendicularly thereto;
d. the top of said first side plate member supporting said top plate member such that the top plate member is disposed perpendicularly to the first side plate member and generally parallel to said base plate;
e. said second side plate member being supported on said base plate, extending perpendicularly thereto and further adjoining and running perpendicular to said first side plate member;
f. said clutch mounting plate member supported on said second side plate member at a distance below the top of the second side plate member such that the clutch mounting plate member is disposed generally perpendicular to the second side plate member and extending generally parallel to said base plate;
g. said top plate member containing a slotted opening;
h. a solvent reservoir resting on top of said top plate member and connected thereto by means of a first hollow coupling member inserted through the slotted opening in the top plate member;
i. said first hollow coupling member comprising a first valve assembly;
j. a second hollow coupling member having two ends, connected at one of its ends to one end of said first hollow coupling member by means of tubing;
k. said second hollow coupling member comprising a threaded pipe assembly and a three way valve assembly;
l. said second hollow coupling member having a solvent ejection nozzle fixed to its other end;
m. a hollow solvent cylinder disposed generally parallel to and set a short distance apart from said first side plate member;
n. said hollow solvent cylinder comprising an internal chamber;
o. said hollow solvent cylinder attached to said second hollow coupling member adjacent said three way valve assembly such that an internal channel provides a passageway from the three way valve assembly to the internal chamber of the hollow solvent cylinder;
p. a piston located within the internal chamber of said hollow solvent cylinder;
q. said piston comprising a head portion which in turn comprises a circumferential groove housing a sealing ring and an extension portion;
r. a piston rod connected at its upper end to said extension portion of the piston and connected to a rod end coupling member at its lower end;
s. said rod end coupling member being a generally H-shaped member with an upper face to which said piston rod is connected, a lower face, and a recessed mid-portion;
t. a first stationary rod and a second statioary rod disposed generally parallel to each other and generally parallel to said second side plate member;
u. said first and second stationary rods attached to said second side plate member;
v. a movable slide member movably attached to said first and second stationary rods;
w. said movable slide member affixed to an angle bracket member which comprises a vertical portion attached to the movable slide member and a horizontal portion extending perpendicularly thereto;
x. the horizontal portion of said angle bracket member containing a transverse opening;
y. a T-shaped lead nut having a horizontal portion and a vertical portion, said T-shaped lead nut being movably inserted through the transverse opening in the horizontal portion of said angle bracket member;
z. the horizontal portion of the T-shaped lead nut pressing against the surface of the horizontal portion of said angle bracket while the vertical portion of the T-shaped lead nut extends through the transverse opening;
aa. the vertical portion of said T-shaped lead nut containing an internally threaded shaft;
bb. securing means capable of causing said T-shaped lead nut to become attached to and move with said angle bracket member when tightened and permitting the T-shaped lead nut to move independently of the angle bracket member when loosened;
cc. said angle bracket member being joined to said rod end coupling member such that the horizontal portion of said angle bracket abuts the recessed mid-portion of the rod end coupling member and is sandwiched between the upper face and the lower face of the rod end coupling member;
dd. said clutch mounting plate member containing a transverse opening;
ee. a threaded rod disposed generally parallel to said first and second side plate members, connected into the internal shaft of said T-shaped lead nut at its lower end and extending through the transverse opening in said clutch mounting plate at its upper end;
ff. a first one-way clutch attached adjacent the upper portion of said threaded rod and movably supported by said clutch mounting plate member;
gg. a second one-way clutch attached at the upper portion of said threaded rod;
hh. said first one-way clutch and said second oneway clutch permitting the threaded rod to rotate in the same direction;
ii. a movable lever arm assembly attached to the lower extremity of said second one-way clutch;
jj. said movable lever arm assembly comprising a base portion attached to said rod and to said second one-way clutch and an arm portion extending generally parallel to the base plate and toward said first side plate member;
kk. a slotted opening in said first side plate member which permits the arm portion of said movable lever arm assembly to pass therethrough and to move in a transverse direction within the first side plate member;
ll. a spring support member attached to said first side plate member;
mm. a return spring attached to the tip of the arm portion of the movable lever arm assembly at one end and attached to and supported by the spring support member at its opposite end;
nn. a stop block attached to the arm portion of the movable lever arm assembly at a location adjacent the internal face of the first side plate member;

oo. a first adjustable arm stopping means supported on said second side plate member and extending toward said stop block;
pp. a second adjustable arm stopping means supported on said spring support member and extending towards said stop block such that the stop block is located betewen the first and second adjustable arm stopping means;
qq. an air cylinder attached to the internal face of said second side plate member at a location aligned with the arm portion of the movable lever arm assembly;
rr. said air cylinder comprising a movable tip aligned with and set a short distance from the arm portion of said movable lever arm assembly;
ss. a directional air valve located adjacent the outer face of said second side plate member and connected to said air cylinder by air intake and air exhaust tubing members;
tt. a solvent pump start means connected to said directional air valve;
uu. a signalling means comprising upper and lower exterior surfaces and an activating switch fixed to said lower surface of said signalling means, located on the outer face of said second side plate member at a location between said base plate and said clutch mounting plate member;
vv. said second side plate member further comprising an elongated vertically disposed internal slot extending from adjacent said base plate to adjacent the activating switch on said signalling means; and
ww. a switch activating member attached to said slide member movably supported by said stationary rods, extending through said elongated vertically disposed internal slot and aligned with said activating switch;
xx. whereby when said solvent reservoir is filled with solvent, said first valve assembly is rotated to the open position so that solvent may flow through said first hollow coupling member to said second hollow coupling member and said three way valve assembly is opened to permit solvent to flow from said second hollow coupling member to the internal chamber of said hollow solvent cylinder, said T-shaped nut is permitted to move independently of said angle bracket member and is screwed downwardly on said threaded rod until it is adjacent said base plate, thereby permitting said angle bracket member to be moved downwardly to adjacent said base plate which action causes said rod end coupling member to move with the angle bracket member thereby moving said piston rod in a downward direction and causes said piston to move downwardly inside said hollow solvent cylinder until said piston is at the bottom of the internal chamber, the downward movement of the piston creating a suction effect to permit the internal chamber to be filled with solvent, said first valve being thereafter closed and said three way valve assembly being adjusted so that solvent may flow from said internal chamber to said solvent ejection nozzle, activating said solvent pump start means which causes said directional air valve to force air into said air cylinder on the air intake cycle which in turn causes said movable tip to move toward and push the arm portion of said movable lever arm assembly to thereby cause the arm portion to move by a predetermined amount based upon the settings of said first and second adjustable arm stopping means, which movement further causes rotation to said second one-way clutch which in turn causes said threaded shaft to rotate by a given amount which in turn causes said T-shaped nut to rotate on said threaded rod by the same amount which in turn causes said angle bracket member to move which in turn causes said rod end coupling member to move which in turn causes said piston to move and displace a selected amount of solvent from the internal chamber which solvent then exits the chamber and is ejected through the solvent ejection nozzle, the air pressure then being removed from said air cylinder on the exhaust cycle to thereby permit said return spring to return the movable lever arm assembly to its original position while the threaded rod remains stationary due to the action of the other one way clutch, and wherein the cycle is caused to be repeated over again in repetitive fashion until the switch button activator member has been moved by a sufficient distance to activate the signalling means.

* * * * *